United States Patent
Mitrovic

(10) Patent No.: US 10,240,715 B2
(45) Date of Patent: Mar. 26, 2019

(54) ADJUSTABLE PANEL MOUNT

(71) Applicant: Mrail Inc., Mississauga (CA)

(72) Inventor: Milan Mitrovic, Mississauga (CA)

(73) Assignee: Mrail Inc., Mississauga, Ontario (CA)

( * ) Notice: Subject to any disclaimer, the term of this patent is extended or adjusted under 35 U.S.C. 154(b) by 0 days.

(21) Appl. No.: 15/943,969

(22) Filed: Apr. 3, 2018

(65) Prior Publication Data
US 2018/0283605 A1  Oct. 4, 2018

Related U.S. Application Data

(62) Division of application No. 15/232,861, filed on Aug. 10, 2016, now Pat. No. 9,945,511.

(51) Int. Cl.
| | | |
|---|---|---|
| *A47B 91/00* | (2006.01) | |
| *F16M 13/02* | (2006.01) | |
| *E04B 2/74* | (2006.01) | |
| *E04C 2/12* | (2006.01) | |

(52) U.S. Cl.
CPC ........... *F16M 13/02* (2013.01); *E04B 2/7401* (2013.01); *E04B 2/7405* (2013.01); *E04C 2/12* (2013.01); *E04B 2002/7496* (2013.01)

(58) Field of Classification Search
None
See application file for complete search history.

(56) References Cited

U.S. PATENT DOCUMENTS

| | | | |
|---|---|---|---|
| 4,054,268 A | 10/1977 | Sher | |
| 4,837,993 A * | 6/1989 | Studenski | E06B 3/02 |
| | | | 52/208 |
| 4,870,793 A * | 10/1989 | Tomlinson | E04B 2/7405 |
| | | | 52/241 |
| 7,559,536 B1 | 7/2009 | Hansen et al. | |
| 8,500,110 B2 | 8/2013 | Allen | |
| 8,549,817 B2 * | 10/2013 | Burke | A47F 3/12 |
| | | | 52/716.8 |

(Continued)

FOREIGN PATENT DOCUMENTS

| | | |
|---|---|---|
| CA | 2962407 A1 | 4/2015 |
| WO | 2015047109 | 4/2015 |

OTHER PUBLICATIONS

WIPO, International Search Report and Written Opinion relating to WO application No. PCT/CA2017/050927, dated Nov. 14, 2017.

(Continued)

*Primary Examiner* — Monica E Millner
(74) *Attorney, Agent, or Firm* — Rowand LLP

(57) ABSTRACT

A panel mount including a base, a first jaw, and a second jaw is provided. The panel mount includes a first and second threaded hole in the first jaw having fasteners received therein. The first threaded hole is nearer to the base than the second threaded hole. The panel mount includes a first and a second protrusion when fasteners are adjusted to protrude from the first jaw towards the second jaw. The panel mount includes a pivot protrusion on the second jaw. A panel is to be fastened between the pivot protrusion and at least one of the first protrusion or the second protrusion. Further, when one of the threaded fasteners protrudes from the first jaw at a greater distance than the other of the threaded fasteners, the panel may pivot about an axis centered on the pivot protrusion.

13 Claims, 11 Drawing Sheets

(56) References Cited

U.S. PATENT DOCUMENTS

| | | | | |
|---|---|---|---|---|
| 8,910,928 B2* | 12/2014 | Header | ............... | E04D 13/10 269/91 |
| 9,127,474 B2 | 9/2015 | Tinwala | | |
| 9,169,640 B2* | 10/2015 | Jeffers | ............... | E04B 2/7422 |
| 9,328,863 B2* | 5/2016 | Allen | ............... | E04F 11/1851 |
| 9,714,670 B2* | 7/2017 | Header | ............... | E04D 13/10 |
| 9,752,327 B2* | 9/2017 | Poradzisz | ............... | E04F 11/1812 |
| 9,777,484 B2* | 10/2017 | Header | ............... | E04F 11/1853 |
| 9,816,276 B2* | 11/2017 | Noble | ............... | E04F 11/1834 |
| 2005/0102958 A1* | 5/2005 | Anderson | ............... | E04D 3/362 52/698 |
| 2005/0246981 A1* | 11/2005 | Austin | ............... | E04F 11/1853 52/208 |
| 2008/0302928 A1* | 12/2008 | Haddock | ............... | E04F 13/0821 248/205.1 |
| 2010/0225040 A1 | 9/2010 | Allen | | |
| 2010/0307082 A1* | 12/2010 | Nash | ............... | E04F 11/1851 52/238.1 |
| 2014/0334874 A1 | 11/2014 | Allen | | |
| 2015/0197959 A1* | 7/2015 | Tinwala | ............... | E04H 17/16 256/24 |
| 2015/0240851 A1* | 8/2015 | Giacometti | ............... | F16B 9/023 403/374.3 |
| 2015/0267415 A1 | 9/2015 | Zhou | | |
| 2016/0281366 A1* | 9/2016 | Spence | ............... | E04F 11/1812 |

OTHER PUBLICATIONS

USPTO, U.S. Office Action relating to U.S. Appl. No. 15/232,861 dated May 1, 2017.
USPTO, U.S. Office Action relating to U.S. Appl. No. 15/232,861 dated Oct. 6, 2017.
USPTO, U.S. Notice of Allowance relating to U.S. Appl. No. 15/232,861 dated Jan. 10, 2018.

* cited by examiner

ADJUSTABLE PANEL MOUNT

CROSS-REFERENCE TO RELATED APPLICATIONS

The present application is a divisional of U.S. patent application Ser. No. 15/232,861, filed Aug. 10, 2016, the contents of which are hereby incorporated by reference.

FIELD

The present application generally relates to panel mounts and, in particular, panel mounts for adjustably fastening a panel to a structure.

BACKGROUND

Mounts for building panels, such as glass panels, wood panels, plastic panels, or concrete panels, often include a channel for receiving a portion of one or more building panels. Once a panel is placed and positioned within the channel, various methods may be used to secure the one or more panels within the channel. For example, cement or non-shrinking cement may be poured into the channel. Wedge-like devices may also be inserted into channels to occupy space between one or more panels and channel walls. The wedge-like devices may also function to press a panel against a channel wall. Alternatively, bolts that are in alignment and that originate from both sides of a channel may apply simultaneous force to secure panels within the channel. That is, force from a first bolt on a first side of the channel is complemented by an aligned force from a second bolt on the opposing side of the channel to secure the panel in a position perpendicular to a base.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
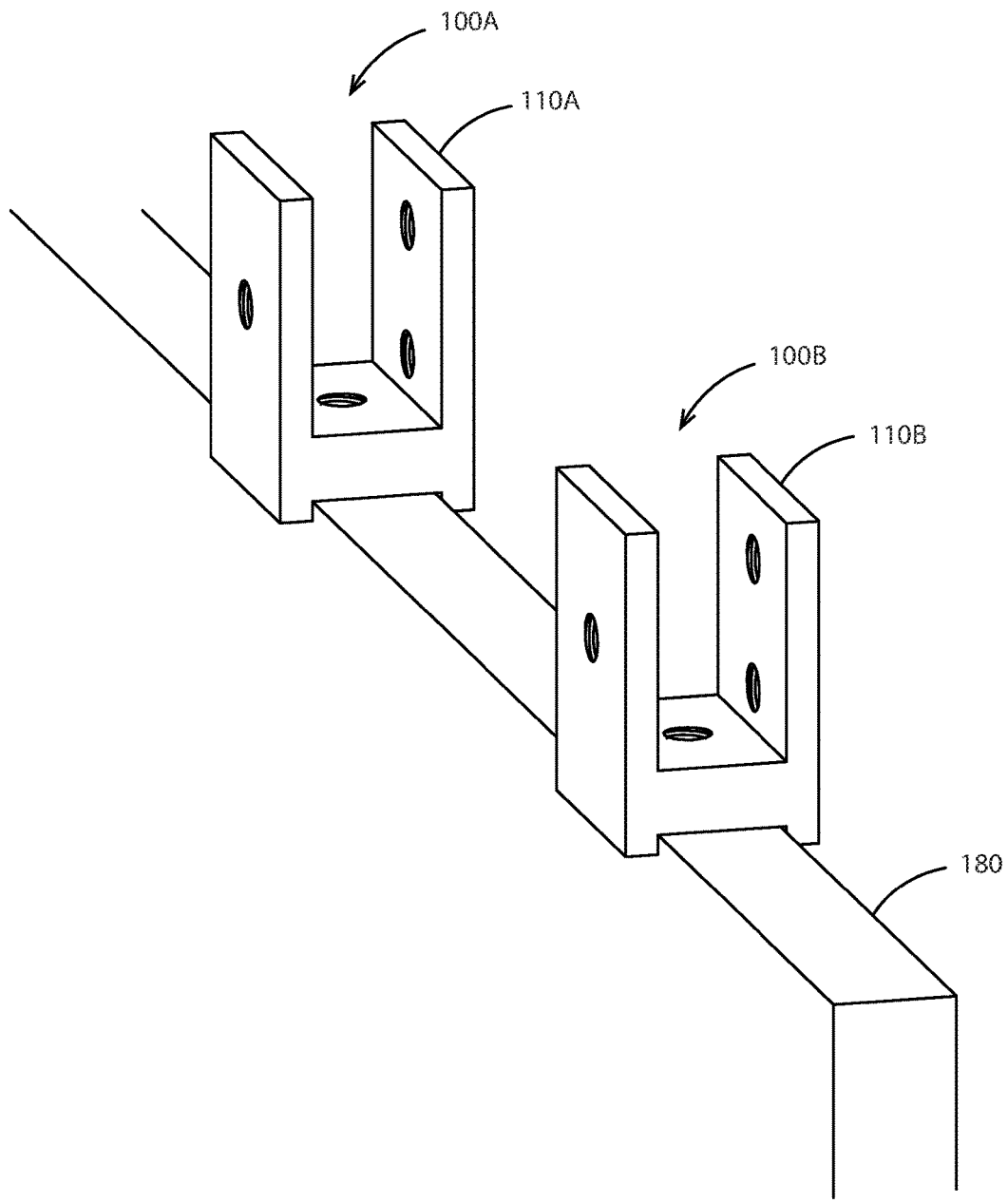
FIG. 1 is a perspective view of a structure having a first panel mount body and a second panel mount body mounted thereon.

The present application describes devices for mounting panels, such as glass, wood, plastic, or concrete panels. Some embodiments of the present application may provide for fastening a panel to a structure and facilitating quick adjustments to the panel in a simple and non-destructive way. For example, some embodiments of the present application may facilitate adjustments to be made to the panel without requiring access to opposing sides of the panel or the panel mount.

In accordance with the present application, there is provided a panel mount for adjustably fastening a panel to a structure. The panel mount includes a base having a first base surface and a first jaw and a second jaw extending from the first base surface. The first jaw and the second jaw define an elongate slot. The panel mount also includes a first threaded hole and a second threaded hole in the first jaw. The first threaded hole and the second threaded hole extend through the first jaw. The first threaded hole is nearer to the first base surface than the second threaded hole. The panel mount also includes a first threaded fastener received within the first threaded hole. The first threaded fastener is a first protrusion when the first threaded fastener is adjusted to protrude from the first jaw towards the second jaw. The panel mount also includes a second threaded fastener received within the second threaded hole. The second threaded fastener is a second protrusion when the second threaded fastener is adjusted to protrude from the first jaw towards the second jaw. The panel mount also includes a pivot protrusion on the second jaw. The pivot protrusion extends in a perpendicular direction from the second jaw towards a position on the first jaw intermediate the first threaded hole and the second threaded hole. The panel is to be fastened between the pivot protrusion and at least one of the first protrusion or the second protrusion.

In another aspect, there is provided another panel mount for adjustably fastening a panel to a structure. The panel mount includes a base having a first base surface and a first jaw and a second jaw extending from the first base surface. The first jaw and the second jaw define an elongate slot. The panel mount also includes a first threaded hole and a second threaded hole in the first jaw. The first threaded hole and the second threaded hole extends through the first jaw. The first threaded hole is nearer to the first base surface than the second threaded hole. The panel mount also includes a first threaded fastener received within the first threaded hole. The first threaded fastener is a first protrusion when the first threaded fastener is adjusted to protrude from the first jaw towards the second jaw. The panel mount also includes a second threaded fastener received within the second threaded hole. The second threaded fastener is a second protrusion when the second threaded fastener is adjusted to protrude from the first jaw towards the second jaw. The panel mount also includes a rocker plate positioned between the first jaw and the second jaw. The rocker plate includes a rocker body having a convex protrusion. The convex protrusion abuts the second jaw to provide a pivot point about an axis centered on the convex protrusion. The panel is to be fastened between the rocker plate and at least one of the first protrusion or the second protrusion.

In another aspect, there is provided a panel mount system including a plurality of panel mounts as described herein. The plurality of panel mounts may be successively positioned to receive a portion of one or more received panels.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is first made to FIG. 1, which is a perspective view of a structure 180 having a first panel mount 100A and a second panel mount 100B mounted thereon. Although two panel mounts are illustrated, the structure 180 may have any number of panel mounts mounted thereon. For ease of illustration, the first panel mount 100A is illustrated by the first panel mount body 110A and the second panel mount 100B is illustrated by the second panel mount body 110B. As will be apparent in the description that follows, the first panel mount 100A and the second panel mount 100B may include a rocker plate, an adjustable plate, compression pads, and/or threaded fasteners.

The first panel mount 100A and the second panel mount 100B may cooperatively receive a panel for adjustably fastening the panel to the structure 180. For example, several panel mounts may be positioned around a perimeter of a backyard deck, and the panel mounts may receive one or more panels in elongate slots defined by the panel mounts. The received one or more panels may be securely fastened in a position that may be perpendicular to the backyard deck surface.

In one example, the first panel mount 100A and the second panel mount 100B may cooperatively receive a rectangular glass panel for fastening the glass panel to the structure 180. As will be apparent from the description below, the position of the received glass panel may be adjusted using threaded fasteners from one side of the glass panel. For example, the received glass panel may be adjusted to a position that is offset from a perpendicular position relative to a base surface. The first panel mount 100A may receive one portion of the rectangular glass panel and the second panel mount 100B may receive a second portion of the glass panel. In another example, the first panel mount 100A and the second panel mount 100B may collectively receive a rectangular wood panel for fastening the wood panel to the structure 180. In the description that follows, some embodiments are described for receiving panels, such as glass, wood, concrete, or plastic panels, within panel mounts. It will be appreciated that aspects of the present application may be implemented to receive any other types of materials receivable within an elongate slot defined by the panel mount.

Figure 2:
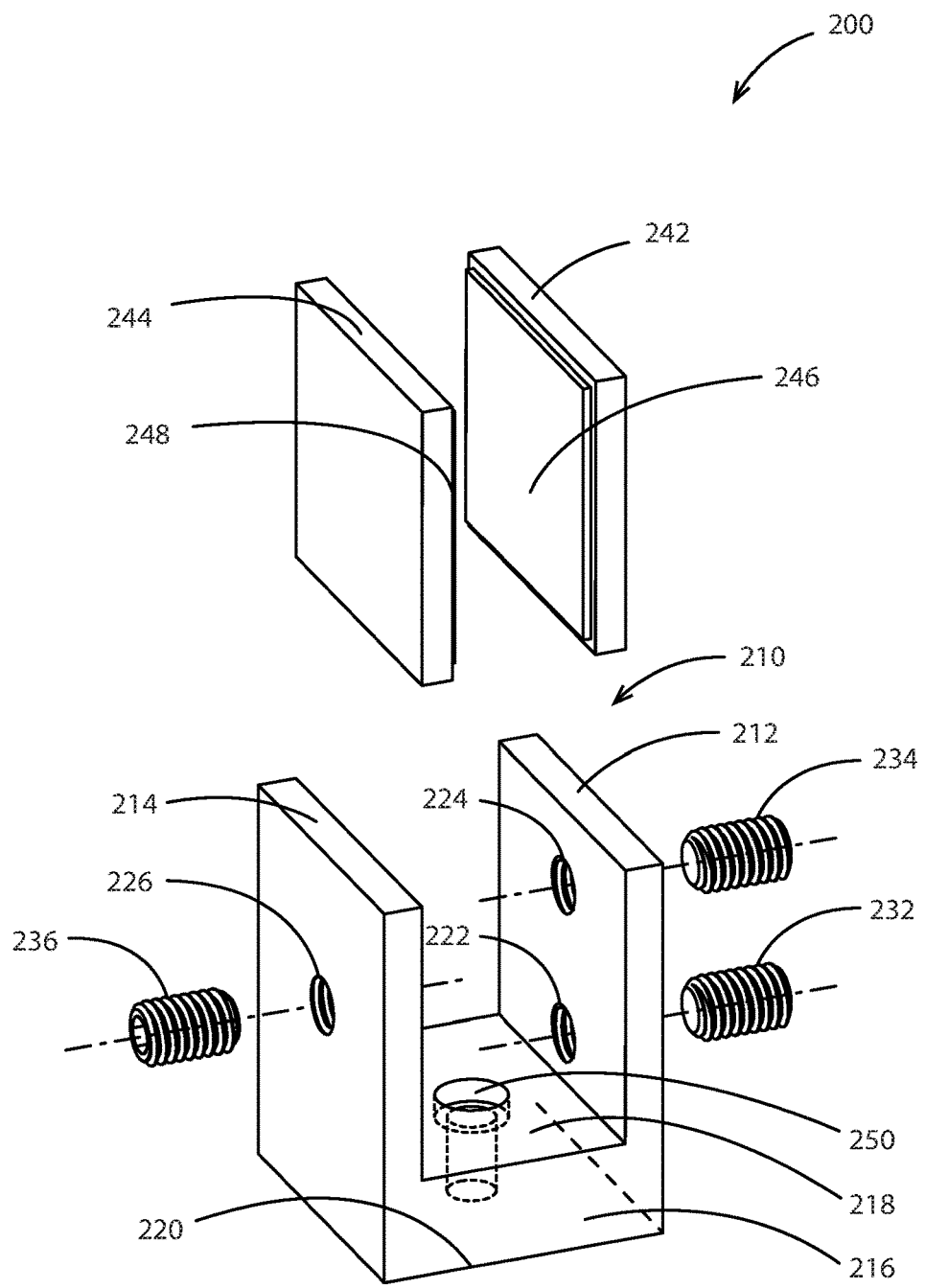
FIG. 2 is an exploded perspective view of an example panel mount.

Reference is now made to FIG. 2, which is an exploded perspective view of an example panel mount 200 of the present application. The panel mount 200 includes a panel mount body 210, threaded fasteners (e.g., first threaded fastener 232, second threaded fastener 234, third threaded fastener 236), an adjustable plate 242, a rocker plate 244, and compression pads, such as adjustable plate compression pad 246 and rocker plate compression pad 248.

The panel mount body 210 includes a base 216 having a first base surface 218 and a second base surface 220. The panel mount body 210 may also include a first jaw 212 and a second jaw 214 extending from the base 216 or the first base surface 218. The first jaw 212 and the second jaw 214 may define an elongate slot for receiving a panel therebetween. That is, the first jaw 212, the second jaw 214, and the base 216 may form a U-shape for receiving a panel therebetween.

The panel mount body 210 may also include a first threaded hole 222 and a second threaded hole 224 in the first jaw 212. The first threaded hole 222 and the second threaded hole 224 may extend through the first jaw 212. That is, the first threaded hole 222 and the second threaded hole 224 may be through-holes in the first jaw 212. For example, as illustrated in FIG. 2, a threaded hole may begin with a first opening on a first surface of a jaw and end with a second opening on an opposing surface of the jaw. The first threaded hole 222 and the second threaded hole 224 may be sized for receiving complementary threaded fasteners. Threaded fasteners may include screws, bolts, rods, or other similar discrete hardware that may have screw threads along an elongate body.

The first threaded hole 222 may be nearer to the first base surface 218 than the second threaded hole 224. For example, as illustrated in FIG. 2, the direct distance between the first threaded hole 222 and the first base surface 218 may be less than the direct distance between the second threaded hole 224 and the first base surface 218. Thus, in FIG. 2, the first threaded hole 222 may be below the second threaded hole 224.

Referring still to FIG. 2, the panel mount body 210 may include a third threaded hole 226 in the second jaw 214. The third threaded hole 226 may extend through the second jaw 214. That is, the threaded hole 226 may be a through-hole in the second jaw 214. For example, the third threaded hole 226 may begin with a first opening on a first surface of the second jaw 214 and end with a second opening on an opposing surface of the second jaw 214. In some embodiments, the third threaded hole 226 may be sized for receiving a complementary third threaded fastener 236.

In some embodiments, the third threaded fastener 236 may be a screw. When the complementary third threaded fastener 236 is received within the third threaded hole 226, a user may adjust the third threaded fastener 236 by turning the third threaded fastener 236 in a clock-wise or in a counter-clockwise direction. That is, the third threaded fastener 236 may be adjusted towards and away from the first jaw 212. For example, when the third threaded fastener 236 is turned in a clock-wise direction, the third threaded fastener 236 may be adjusted towards the first jaw 212. When the third threaded fastener 236 is turned in a counter-clockwise direction, the third threaded fastener 236 may be adjusted away from the first jaw 212.

For example, when the third threaded fastener 236 is turned in a clock-wise direction, the third threaded fastener 236 may be adjusted within the third threaded hole 226 to traverse towards the first jaw 212 and may protrude the second jaw 214. That is, the third threaded fastener 236 may protrude from a surface of the second jaw 214 that faces the first jaw 212. Accordingly, the third threaded fastener 236 may act as a pivot protrusion. As illustrated in FIG. 2, the pivot protrusion may extend in a perpendicular direction from the second jaw 214 towards a position on the first jaw 212 that is intermediate the first threaded hole 222 and the second threaded hole 224. That is, the pivot protrusion may be offset from the first threaded hole 222 and may be offset from the second threaded hole 224.

In some embodiments, the pivot protrusion on the second jaw 214 may be implemented in a way that does not include a third threaded hole 226. For example, a convex shaped protrusion may be positioned on the second jaw 214 and may extend in a perpendicular direction from the second jaw 214 towards a position on the first jaw 212 that is intermediate the first threaded hole 222 and the second threaded hole 224. As will be apparent in the description that follows, the convex shaped protrusion may be a pivot protrusion and may provide an axis about which a received panel may pivot.

Referring still to FIG. 2, the panel mount body 210 may have a second base surface 220 opposing the first base surface 218. When the panel mount 200 is placed atop a structure (not illustrated in FIG. 2), the second base surface 220 may be adjacent a surface of the abutting structure. In some embodiments, the panel mount body 210 may include a base hole 250 for receiving a base fastener (not illustrated in FIG. 2) for coupling the panel mount 200 to the structure. For example, the base hole 250 may be sized for receiving a base fastener for coupling the panel mount 200 to the abutting structure. For example, the base hole 250 may be a threaded hole sized for receiving a threaded base fastener for coupling the panel mount 200 to the abutting structure. The threaded base fastener may be threaded through the base hole 250 and engage with the abutting structure surface for coupling the panel mount 200 to the structure. In some other embodiments, the base hole 250 may be a non-threaded hole and may be configured to receive various types of anchor fasteners. For example, if the panel mount 200 is placed atop a concrete structure, anchor fasteners such as wedge anchors, sleeve anchors, and/or tapcon screws may be used in the base hole 250 for coupling the panel mount 200 to the abutting concrete structure. If the panel mount 200 is placed atop a wood structure, anchor fasteners such as lag bolts may be used in the base hole 250 for coupling the panel mount 200 to the abutting wood structure. The aforementioned anchor fasteners are examples and any other suitable anchor fasteners may be used. In the embodiment illustrated in FIG. 2, the base hole 250 may be positioned on a portion of the base 216 that is between the first jaw 212 and the second jaw 214.

In some embodiments, the panel mount 200 may not include a base hole 250. That is, the panel mount 200 may be coupled to the structure by other fastening means. For example, the panel mount 200 may be coupled to the structure using adhesive. In some other embodiments, the panel mount 200 may be coupled to the structure using hook and look fasteners or another fastening means. In some other embodiments, the panel mount 200 may be cemented or nailed to the structure.

Although the first panel mount 100A and the second panel mount 100B in FIG. 1 and the panel mount 200 in FIG. 2 may sit atop an adjacent structure, in some embodiments, the panel mount 200 may be fastened to a ceiling and may be suspended from a ceiling. In other embodiments, the panel mount 200 may be fastened to a wall or frame that is perpendicular to a ground surface.

The panel mount body 210 illustrated in FIG. 2 may have an overall shape that occupies a volume of air having a shape of a rectangular prism. In other examples, a panel mount body of a panel mount can occupy a volume of air having any other shape.

Figure 3:
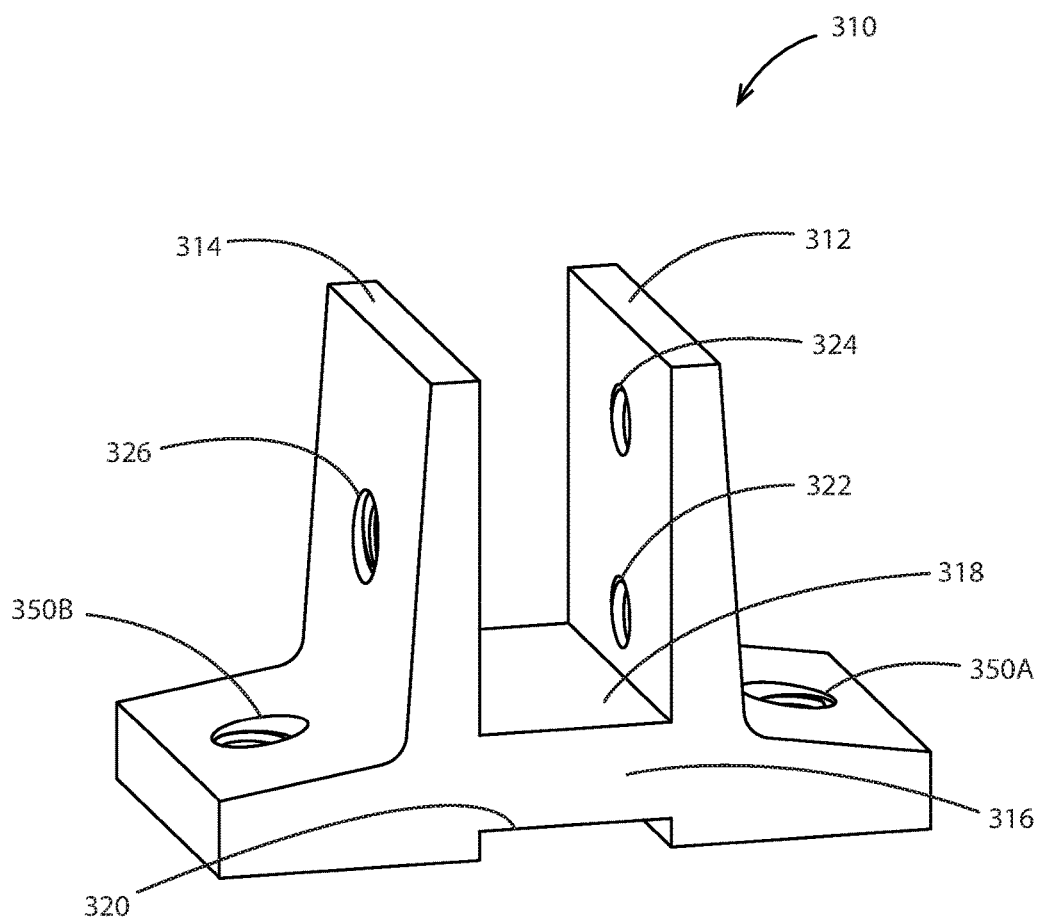
FIG. 3 is a perspective view of an example panel mount body.

Reference is now made to FIG. 3, which is a perspective view of another example panel mount body 310 in accordance with an embodiment of the present application. As illustrated in FIG. 3, the panel mount body 310 may have an overall shape that occupies a volume of air that is different than that occupied by the panel mount body 210 illustrated in FIG. 2.

The panel mount body 310 includes a base 316 having a first base surface 318 and a second base surface 320. The panel mount body 310 may also include a first jaw 312 and a second jaw 314 extending from the first base surface 318. The first jaw 312 and the second jaw 314 define an elongate slot for receiving a panel therebetween.

The panel mount body 310 may also include a first threaded hole 322 and a second threaded hole 324. The first threaded hole 322 and the second threaded hole 324 may extend through the first jaw 312. That is, the threaded holes 322, 324 may be through-holes in the first jaw 212. For example, a threaded hole may begin with a first opening on a first surface of a jaw and end with a second opening on an opposing second surface of the jaw. The first threaded hole 322 and the second threaded hole 324 may be sized for receiving complementary threaded fasteners.

Similar to the panel mount body 210 that is illustrated in FIG. 2, the first threaded hole 322 may be nearer to the first base surface 318 than the second threaded hole 324. For example, as illustrated in FIG. 3, the direct distance between the first threaded hole 322 and the first base surface 318 may be less than the direct distance between the second threaded hole 324 and the first base surface 318. Thus, the first threaded hole 322 may be below the second threaded hole 324.

Referring still to FIG. 3, the panel mount body 310 may include a third threaded hole 326 in the second jaw 314. The third threaded hole 326 may extend through the second jaw 314. That is, the threaded hole 326 may be a through-hole in the second jaw 314. For example, the third threaded hole 326 may begin with a first opening on a first surface of the second jaw 314 and end with a second opening on an opposing surface of the second jaw 314. In some embodiments, the third threaded hole 326 may be sized for receiving a complementary fastener.

In some embodiments, the panel mount body 310 may be configured to be placed atop a structure (not illustrated in FIG. 3). That is, the second base surface 320 may be adjacent a surface of the abutting structure. In some embodiments, the panel mount body 310 may include one or more base holes 350A, 350B for receiving one or more base fasteners (not illustrated in FIG. 3) for coupling the panel mount body 310 to the structure. The one or more base holes 350A, 350B may be sized for receiving one or more base fasteners or anchor fasteners for coupling the panel mount body 310 to the abutting structure. As discussed with reference to FIG. 2, anchor fasteners may include wedge anchors, sleeve anchors, tapcon screws and/or lag bolts.

In the embodiment illustrated in FIG. 3, the one or more base holes 350A, 350B are not positioned on a portion of the base 316 that is between the first jaw 312 and the second jaw 314. For example, as illustrated in FIG. 3, the one or more base holes 350A, 350B may be positioned on a portion of the base 316 that is outside an elongate slot defined by the first jaw 312 and the second jaw 314.

In some other embodiments, one or more base holes may be positioned on portions of the base 316 that are: (1) between the first jaw 312 and the second jaw 314; and (2) on portions of the base 316 that are outside the elongate slot defined by the first jaw 312 and the second jaw 314.

In some embodiments, as illustrated in FIG. 3, the second base surface 320 may have a larger surface area compared to the second base surface 220 of the panel mount body 210 that is illustrated in FIG. 2. That is, when the panel mount body 310 is coupled to a structure, the surface area of the panel mount body 310 that abuts the adjacent structure may be larger than the surface area of the panel mount body 210 illustrated in FIG. 2 that abuts the adjacent structure.

Referring again to FIG. 2, threaded fasteners may be received within threaded holes of the first jaw 212 and the second jaw 214. For example, a first threaded fastener 232 may be received within the first threaded hole 222. A second threaded fastener 234 may be received within the second threaded hole 224. A third threaded fastener 236 may be received within the third threaded hole 226. In some embodiments, the first threaded hole 222, the second threaded hole 224, and the third threaded hole 226 may be sized for coupling or mating with a complementary first threaded fastener 232, a complementary second threaded fastener 234, and a complementary third threaded fastener 236, respectively. In some embodiments, the threaded fasteners may be screws.

In some embodiments, the first threaded fastener 232, the second threaded fastener 234, and the third threaded fastener 236 may be independently adjustable towards and away from an opposing jaw. For example, the first threaded fastener 232 may be threaded in a clockwise direction and may be driven from the first jaw 212 to the second jaw 214. When the first threaded fastener 232 is driven a distance from the first jaw 212 to the second jaw 214, a portion of the threaded fastener 232 may protrude or emerge from a surface of the first jaw 212 that faces the second jaw 214. Similarly, the second threaded fastener 234 may be driven a distance from the first jaw 212 to the second jaw 214. Because the first threaded fastener 232 and the second threaded fastener 234 may be independently adjusted, the first threaded fastener 232 and the second threaded fastener 234 may protrude or emerge from the surface of the first jaw 212 by a different distance. Because the first threaded fastener 232 and the second threaded fastener 234 may protrude or emerge from the surface of the first jaw 212 by a different distance, a panel received within the elongate slot defined by the first jaw 212 and the second jaw 214 may be tilted by turning the first threaded fastener 232 and the second threaded fastener 234 received within the first jaw 212. That is, embodiments of the present application enable a user to adjust the position of a received panel, such as tilting or offsetting the panel position from a vertical position, without needing access to both sides of the panel.

In addition, the third threaded fastener 236 may be threaded in a clockwise direction and may be driven from the second jaw 214 to the first jaw 212. When the third threaded fastener 236 is driven a distance from the second jaw 214 to the first jaw 212, a portion of the third threaded fastener 236 may protrude or emerge from a surface of the second jaw 214. As will be apparent in the description that follows, when a portion of the third threaded fastener 236 protrudes or emerges from a surface of the second jaw 214 that faces the first jaw 212, the protrusion may be a pivot protrusion and may provide an axis about which a received panel may pivot.

In some embodiments, the first threaded fastener 232 may be a first protrusion when the first threaded fastener 232 is adjusted to protrude from the first jaw 212 towards the second jaw 214. Similarly, the second threaded fastener 234 may be a second protrusion when the second threaded fastener 234 is adjusted to protrude from the first jaw 212 towards the second jaw 214. Further, a third threaded fastener 236 may be a pivot protrusion when the third threaded fastener 236 is adjusted to protrude from the second jaw 214 towards the first jaw 212. Accordingly, a received panel may be fastened between the pivot protrusion and at least one of the first protrusion or the second protrusion.

Figure 4:
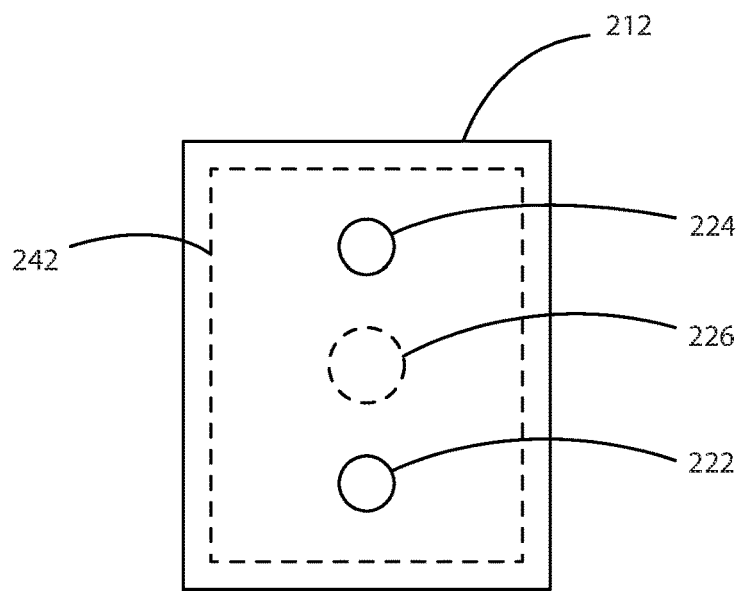
FIG. 4 is a right side elevation view of the panel mount in FIG. 2.

Reference is now made to FIG. 4, which is a right side elevation view of the panel mount body 210 in FIG. 2. The first jaw 212, the first threaded hole 222 and the second threaded hole 224 are illustrated in FIG. 4. Further, the adjustable plate 242 and the third threaded hole 226 are illustrated with hatched lines. In some embodiments, the panel mount 200 may be made of an opaque material. Because the adjustable plate 242 and the third threaded hole 226 may not be visible when viewing the panel mount 200 from the right side elevation view of FIG. 4, the hatched lines illustrate an example placement of the adjustable plate 242 and the third threaded hole 226 for the panel mount 200.

In some embodiments, the first threaded hole 222, the second threaded hole 224, and the third threaded hole 226 may be positioned along a straight line or in a plane that goes into and comes out of the page of FIG. 4. When the panel mount 200 is viewed from a side elevation view, the third threaded hole 226 may not overlap either of the first threaded hole 222 or the second threaded hole 224. As illustrated in FIG. 4, in some embodiments, the third threaded hole 226 may be at a position that is intermediate or nestled between the first threaded hole 222 and the second threaded hole 224. That is, the third threaded hole 226 may not be aligned with the first threaded hole 222 or the second threaded hole 224.

To illustrate the position of the threaded holes on the panel mount 200, a number of planes may be defined. For example, the base 216 may be in a base plane and the first jaw 212 may be in a first jaw plane. Thus, the first jaw plane may be perpendicular to the base plane. Further, the second jaw 214 may be in a second jaw plane. Thus, the second jaw plane may be parallel to the first jaw plane. The second jaw plane may be perpendicular to the base plane. Additionally, the first threaded hole 222, the second threaded hole 224, and the third threaded hole 226 may be in a protrusion plane. The protrusion plane may be a plane that goes into and comes out of the page of FIG. 4. Thus, the protrusion plane may be perpendicular to the base plane, the first jaw plane, and the second jaw plane.

In other embodiments, the first threaded hole 222, the second threaded hole 224, and the third threaded hole 226 may not be positioned along a straight line or a plane. For example, when viewing the panel mount from a side elevation view, the first threaded hole 222 and the second threaded hole 224 may not be in a plane with the third threaded hole 226. In some embodiments, the first threaded hole 222 and the second threaded hole 224 may be offset from the third threaded hole 226 in a lateral direction. In some other embodiments, the first threaded hole 222 and the second threaded hole 224 may be offset from the third threaded hole 226 by a different distance.

Referring again to FIG. 2, the panel mount 200 may include an adjustable plate 242 and a rocker plate 244. In some embodiments, an adjustable plate 242 and a rocker plate 244 may be positioned within the elongate slot defined by the first jaw 212 and the second jaw 214. In other embodiments, one of the adjustable plate 242 and the rocker plate 244 may be positioned within the elongate slot defined by the first jaw 212 and the second jaw 214. The adjustable plate 242 and the rocker plate 244 may couple force from threaded fasteners protruding from the jaws. In some embodiments, the adjustable plate 242 and the rocker plate 244 may be used to protect the received panel from scratches potentially caused by contact with threaded fasteners.

In some embodiments, the adjustable plate 242 includes a first adjustable plate surface that faces the first jaw 212. The first adjustable plate surface may abut at least one of the first threaded fastener 232 received within the first threaded hole 222 or the second threaded fastener 234 received within the second threaded hole 224.

The adjustable plate 242 may also include a second adjustable plate surface that faces the second jaw 214. In some embodiments, the adjustable plate 242 may include an adjustable plate compression pad 246 positioned on the second adjustable plate surface. When the panel mount 200 receives a panel, the adjustable plate compression pad 246 may abut a panel surface. The adjustable plate compression pad 246 may be made of rubber, plastic, neoprene, or any other material. In some embodiments, the adjustable plate 242 may be made of metal and the adjustable plate compression pad 246 may protect the panel from potential physical abrasions otherwise caused by contact with the adjustable plate 242 being made of metal.

Figure 5:
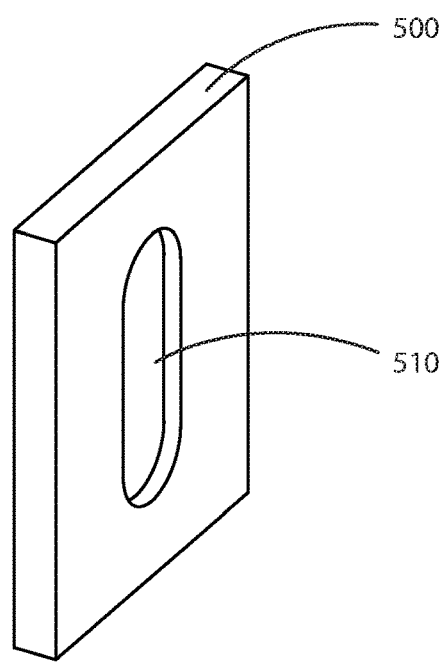
FIG. 5 is a perspective view of an example adjustable plate for use in a panel mount.

Reference is now made to FIG. 5, which is a perspective view of an example adjustable plate for use in a panel mount, in accordance with an embodiment of the present application. The adjustable plate 500 may have a generally rectangular shape. As illustrated in FIG. 5, the adjustable plate 500 may include a shaped indentation 510 positioned in a central location of the adjustable plate 500. The shaped indentation may assist for positioning the adjustable plate 500 to abut at least one of a first threaded fastener 232 or a second threaded fastener 234 received within the first jaw 212. For example, the shaped indentation may be positioned to receive the first threaded fastener 232 or the second threaded fastener 234 to prevent movement of the adjustable plate 500 after installation. In some embodiments, the adjustable plate 500 may not include the shaped indentation 510. Although the adjustable plate 500 is illustrated has having a generally rectangular shape, in some other embodiments, the adjustable plate may have any other shape.

Referring again to FIG. 2, the rocker plate 244 may be positioned within the elongate slot defined by the first jaw 212 and the second jaw 214. The rocker plate 244 may include a first rocker plate surface facing the second jaw 214. The first rocker plate surface may abut at a pivot protrusion on the second jaw 214. As described, the pivot protrusion may extend in a perpendicular direction from the second jaw 214 towards a position on the first jaw that is intermediate the first threaded hole 222 and the second threaded hole 224. The pivot protrusion on the second jaw 214 may provide an axis about which the rocker plate 244 may pivot.

The rocker plate 244 may also include a second rocker plate surface facing the first jaw 212. In some embodiments, the rocker plate 244 may include a rocker plate compression pad 248 positioned on the second rocker plate surface. When the panel mount 200 receives a panel, the rocker plate compression pad 248 may abut a panel surface.

Figure 6:
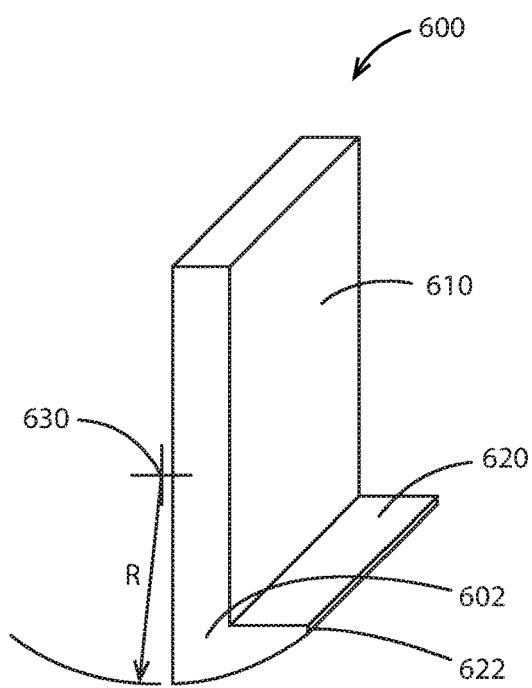
FIG. 6 is a perspective view of an example rocker plate for use in a panel mount.

Reference is now made to FIG. 6, which is a perspective view of an example rocker plate 600 for use in a panel mount. The rocker plate 600 may be positioned within the elongate slot defined by the first jaw 212 and the second jaw 214.

The rocker plate 600 may include a rocker body 610 and a cantilever arm 620. When the rocker plate 600 is positioned between the first jaw 212 and the second jaw 214, the rocker body 610 may be adjacent the second jaw 214. The rocker body 610 may have a first rocker body end 602. The cantilever arm 620 may be coupled to the first rocker body end 602.

When the rocker plate 600 is positioned between the first jaw 212 and the second jaw 214 of a panel mount body 210, the cantilever arm 620 may extend from the first rocker body end 602 towards a first jaw 212 to a cantilever arm end tip 622.

In some embodiments, when the rocker plate 600 is positioned between the first jaw 212 and the second jaw 214 of the panel mount body 210, the rocker body 610 may abut a pivot protrusion on the second jaw 214 to pivot about an axis centered on the pivot protrusion. As described, in some embodiments, the pivot protrusion on the second jaw 214 may include a third threaded fastener 236 that protrudes from a surface of the second jaw 214. That is, the protruding third threaded fastener 236 may be extending in a perpendicular direction from the second jaw towards a position on the first jaw 212, where the position on the first jaw 212 may be intermediate the first threaded hole and the second threaded hole. Referring still to FIG. 6, the rocker body 610 may abut a pivot protrusion on the second jaw 214 at a location indicated by the "X" marking 630 and may pivot about a radius "R".

In some embodiments, when a panel is received within the elongate slot defined by the first jaw 212 and the second jaw 214, the cantilever arm 620 may support the received panel within the elongate slot. That is, the received panel may have a surface abutting the rocker body 610 and may have a surface abutting the cantilever arm 620.

The cantilever arm 620 has a cantilever arm thickness. In some embodiments, the cantilever arm 620 may have a uniform thickness from the first rocker body end 602 to the cantilever arm end tip 622.

In other embodiments, the cantilever arm 620 may have a non-uniform thickness from the first rocker body end 602 to the cantilever arm end tip 622. For example, as illustrated in FIG. 6, the cantilever arm thickness may taper from the first rocker body end 602 to the cantilever arm end tip 622. That is, the thickness of the cantilever arm 620 at a location near the first rocker body end 602 may be largest, while the thickness of the cantilever arm 620 at the cantilever arm end tip 622 may be smallest. In some embodiments, the thickness of the cantilever arm 620 may gradually decrease from the first rocker body end 602 to the cantilever arm end tip 622. As will be apparent from the description below, the tapered thickness of the cantilever arm 620 may facilitate pivoting of the rocker plate 600 about an axis centered on a pivot protrusion on the second jaw 214.

As described, in some embodiments, the rocker plate 244 may include a rocker body and a cantilever arm coupled to the rocker body, such as the rocker plate 600 described with reference to FIG. 6. However, in some other embodiments, the rocker plate 244 may not include a cantilever arm. For example, the rocker plate 244 may include a rocker body without a cantilever arm. The rocker body may have a generally rectangular shape. In some embodiments where the rocker plate 244 may not include a cantilever arm, one or more setting blocks may be positioned on and/or abut the first base surface 218 to prevent contact between a received panel and the first base surface 218. In some embodiments, the one or more setting blocks may be made of rubber and/or plastic material.

Figure 7:
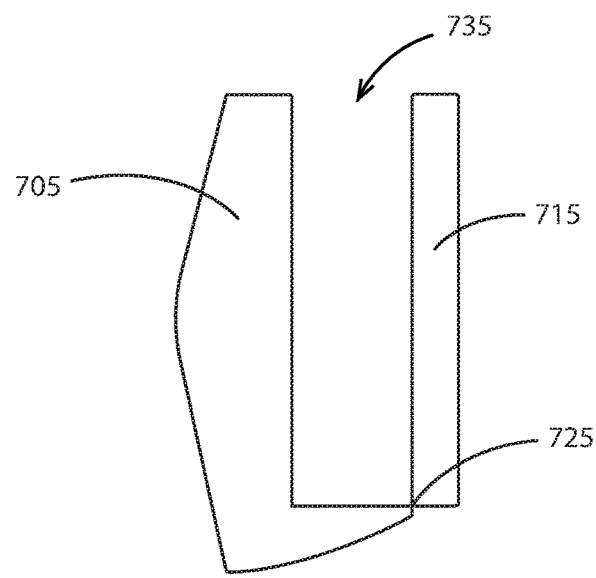
FIG. 7 is a front elevation view of an example rocker plate and adjustable plate for use in a panel mount.

Reference is now made to FIG. 7, which is a front elevation view of an example rocker plate 705 and an adjustable plate 715 for use in a panel mount. The rocker plate 705 may include a rocker body and a cantilever arm, similar to the rocker plate 600 described with reference to FIG. 6. In some embodiments, the rocker plate 705 may be coupled to the adjustable plate 715 at a coupling point 725. When the rocker plate 705 may be coupled to the adjustable plate 715 at the coupling point 725, the rocker plate 705 and the adjustable plate 715 may form a panel receiving slot 735.

In some embodiments, the rocker plate 705 may be coupled to the adjustable plate 715 at the coupling point 725 using adhesive. In other embodiments, the rocker plate 705 and the adjustable plate 715 may be mechanically joined during manufacturing. In some other embodiments, the rocker plate 705 and the adjustable plate 715 may be manufactured as one component.

In some embodiments, the coupling point 725 may be the joining of a cantilever arm end tip 622 and a first adjustable plate end. The first adjustable plate end may be adjacent a first base surface 218 when the adjustable plate is positioned between a first jaw and a second jaw. In some embodiments, the coupling point 725 may be a flexible joint. That is, the joint may allow the adjustable plate 715 to be pushed nearer to or away from the rocker plate 705.

Further, in some embodiments, the surfaces of the rocker plate 705 and the adjustable plate 715 that are within the panel receiving slot 735 may include one or more compression pads (not illustrated in FIG. 7). When a panel is received within the panel receiving slot, the compression pads may be positioned between the panel and the rocker plate 705 and may be positioned between the panel and the adjustable plate 715. The compression pads may be made of rubber, plastic, neoprene, or any other material. In some embodiments, the rocker plate 705 and the adjustable plate 715 may be made of metal and the compression pads may protect the received panel from potential physical abrasions otherwise caused by contact with the rocker plate 705 and the adjustable plate 715 being made of metal.

Although a rocker plate 705 and an adjustable plate 715 may form a panel receiving slot 735 for receiving a panel in a panel mount, in some embodiments, a panel mount 200 may directly receive a panel within the elongate slot defined by the first jaw 212 and second jaw 214. That is, the rocker plate 705 and the adjustable plate 715 may not be inserted in the panel mount. For example, the first threaded fastener 232, the second threaded fastener 234, and the third threaded fastener 236 may protrude surfaces of the jaws and may directly abut surfaces of the received panel.

Figure 8A:
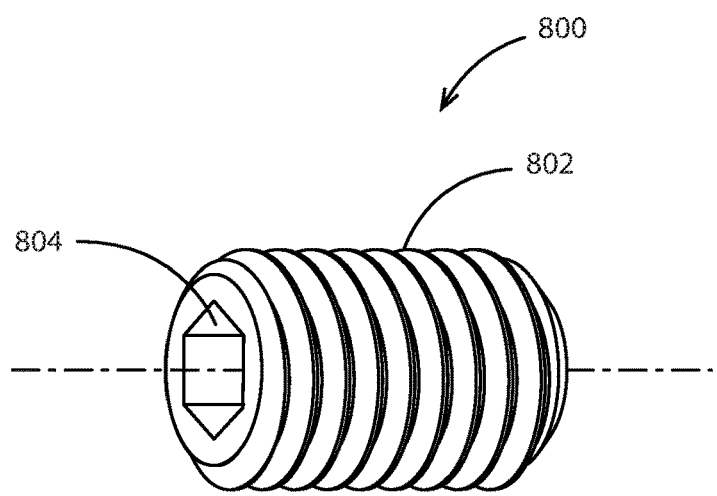
FIG. 8A is a perspective view of an example threaded fastener for use in a panel mount.
Figure 8B:
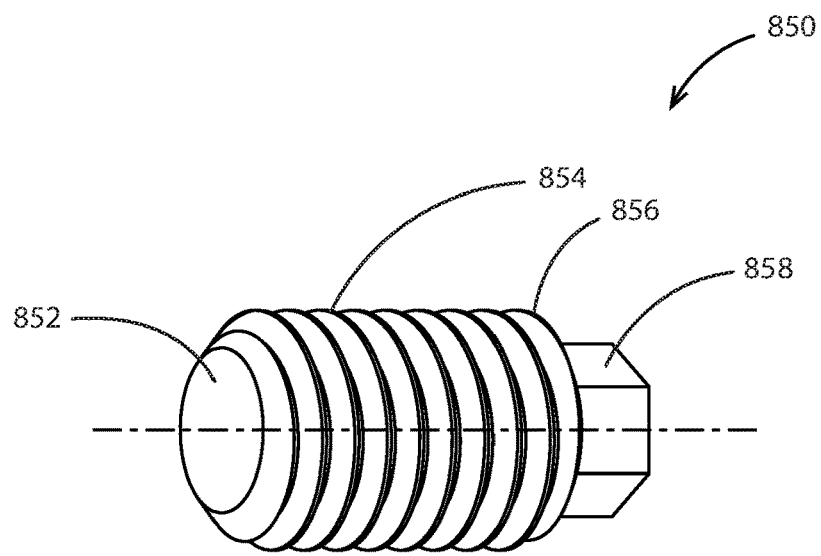
FIG. 8B is a perspective view of another example threaded fastener for use in a panel mount.

Reference is now made to FIGS. 8A and 8B, which are perspective views of example threaded fasteners for use in a panel mount. Referring to FIG. 8A, a threaded fastener 800 may be in the form of a set screw having threads along the full length of the screw 802. In some embodiments, the threaded fastener 800 may have a formation in the form of a polygonal socket 804. For example, the polygonal socket 804 may allow engagement with a wrench or other tool, and the wrench or other tool may be used to adjustably rotate the threaded fastener 800 within a threaded hole of a panel mount. For example, the threaded fastener 800 may be used for at least one of the first threaded fastener 232, the second threaded fastener 234, or the third threaded fastener 236 illustrated in FIG. 2. In some embodiments, the polygonal socket 804 may be of a unique shape. For example, the unique shape may only be engageable with a keyed or specialized tool, rather than commonly found Allen keys or socketed wrenches.

Referring to FIG. 8B, a threaded fastener 850 may be in the form of a set screw having threads along a portion of the threaded fastener 850. For example, the threads 854 may extend from a first end 852 and terminate at a intermediate location 856 between the first end 852 and the second end 858. Further, the threaded fastener 850 may have a non-cylindrical formation at the second end 858 of the threaded fastener. The non-cylindrical formation may be engageable with a wrench or other tool, and the wrench or other tool may be used to adjustably rotate the threaded fastener 850 within a threaded hole of a panel mount. For example, the threaded fastener 850 may be used for at least one of the threaded fastener 232, the second threaded fastener 234, or the third threaded fastener 236 illustrated in FIG. 2.

Figure 9A:
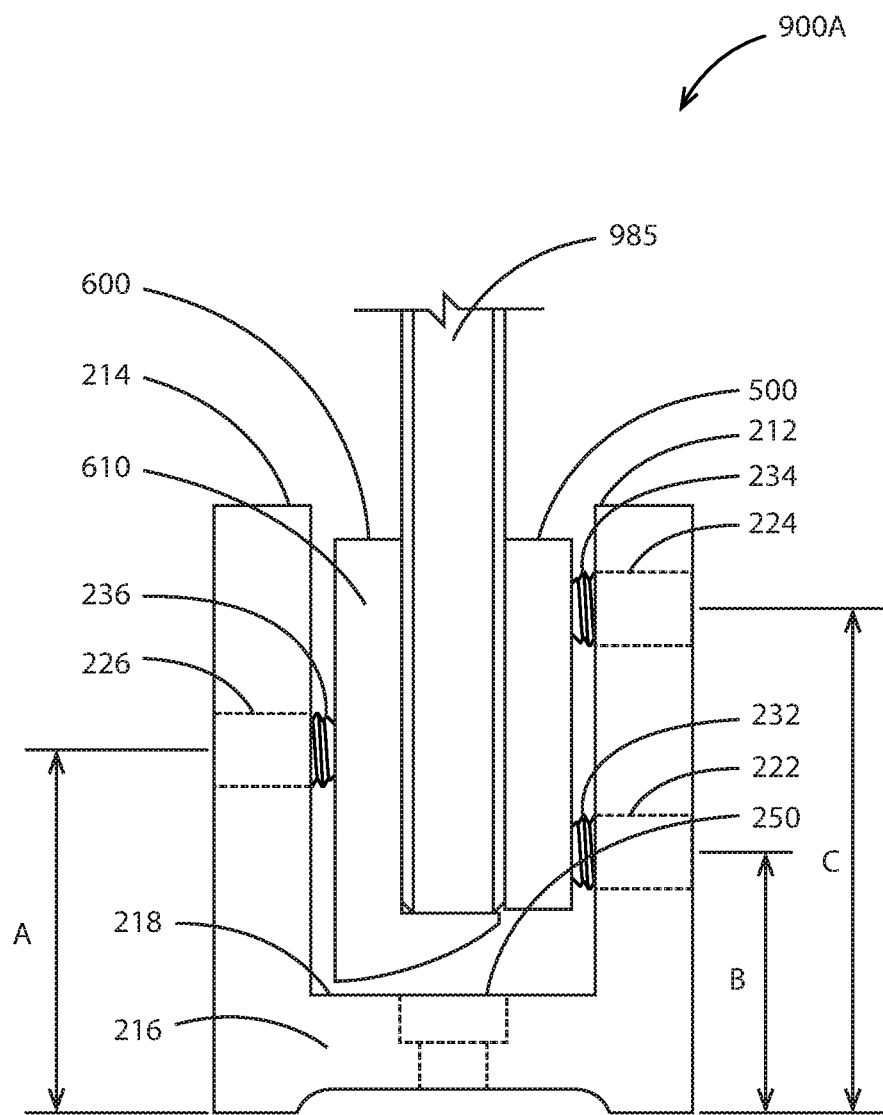
FIG. 9A is a front elevation view of an example panel mount with a panel in a first position.
Figure 9B:
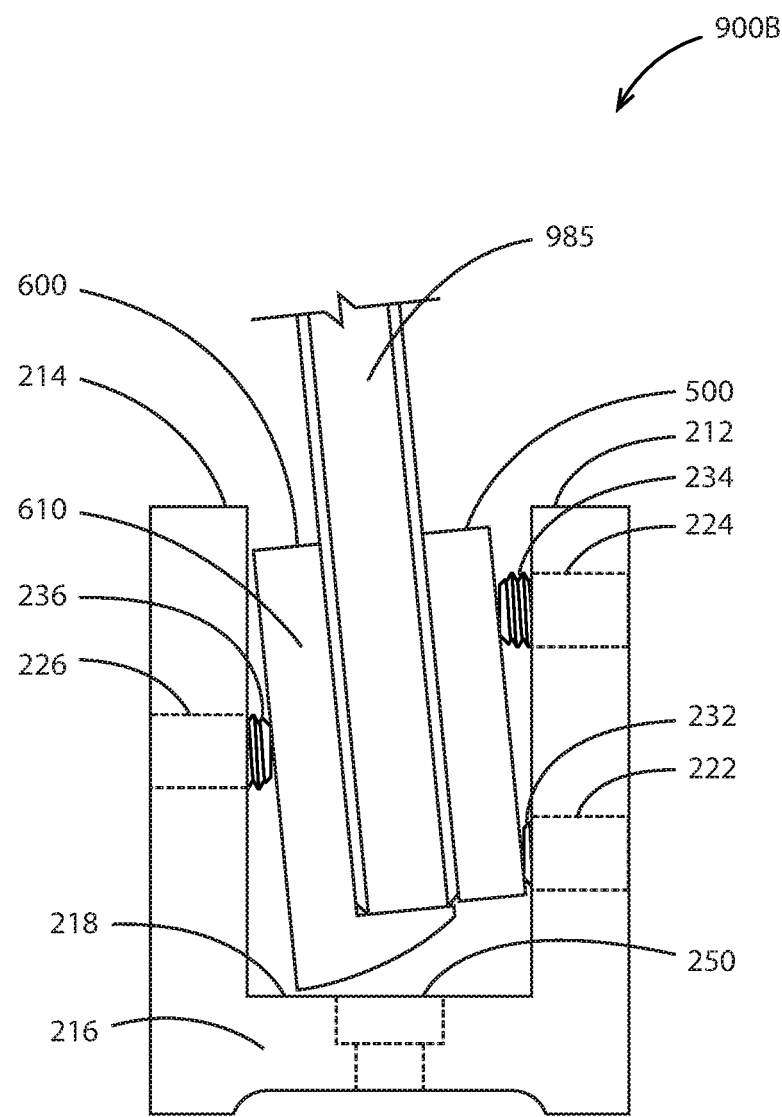
FIG. 9B is a front elevation view of the panel mount of FIG. 9A with the panel adjusted to a second position.
Figure 9C:
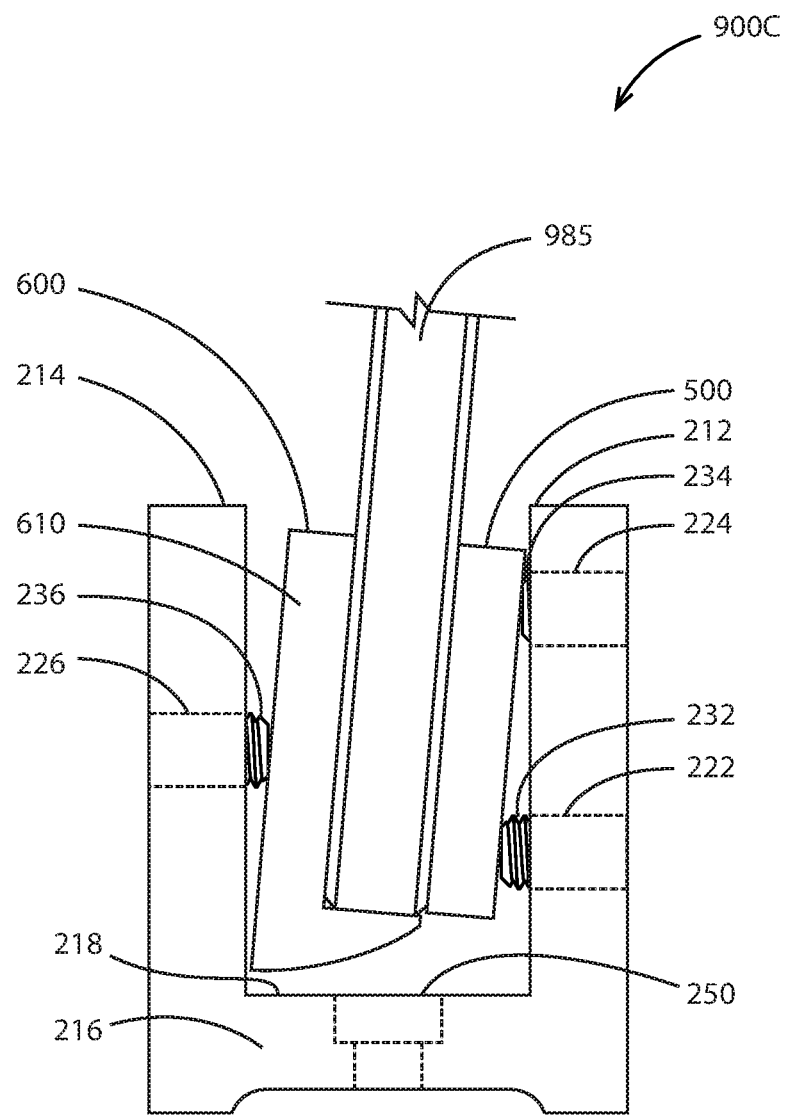
FIG. 9C is a front elevation view of the panel mount of FIG. 9A with the panel adjusted to a third position.

Reference is now made to FIGS. 9A, 9B, and 9C, which are front elevation views of example panel mounts with a panel 985 received between the first jaw 212 and the second jaw 214. Similar reference numerals to those used in preceding figures are used to denote similar components.

Referring now to FIG. 9A, which is a front elevation view of an example panel mount 900A, the rocker plate 600 and the adjustable plate 500 may form a panel receiving slot for receiving the panel 985. The first threaded fastener 232 and the second threaded fastener 234 may be received within the first threaded hole 222 and the second threaded hole 224, respectively, and a user may, for example, rotate the threaded fasteners so that the threaded fasteners protrude or emerge from a surface of the first jaw 212 towards the second jaw 214. For example, when the first threaded fastener 232 is adjusted to protrude form the first jaw 212 towards the second jaw 214, the first threaded fastener 232 may be a first protrusion. Similarly, when the second threaded fastener 234 is adjusted to protrude from the first jaw 212 towards the second jaw 214, the second threaded fastener 234 may be a second protrusion. Further, the third threaded fastener 236 may be received within the third threaded hole 226 and a user may rotate the third threaded fastener 236 so that the third threaded fastener 236 protrudes or emerges from a surface of the second jaw 214 towards the first jaw 212. For example, when the third threaded fastener 236 is adjusted to protrude from the second jaw 214 towards the first jaw 212, the third threaded fastener 236 may be a pivot protrusion. Accordingly, the protruding third threaded fastener 236 may abut the rocker body 610 of the rocker plate 600 and may provide an axis about which the rocker plate 600 may pivot. Further, the received panel 985 may be fastened between the pivot protrusion and at least one of the first protrusion or the second protrusion.

As illustrated in FIG. 9A, the first threaded fastener 232, the second threaded fastener 234, and the third threaded fastener 236 may protrude from a jaw surface by an equal amount. The protruding threaded fastener portions may provide a non-penetrating force to the received panel 985 for fastening the panel 985 within the elongate slot of the panel mount 900A. In the illustrated example of FIG. 9A, the rocker plate 600 couples the non-penetrating force from the third threaded fastener 236 to the panel 985. Similarly, the adjustable plate 500 couples the non-penetrating force from the first threaded fastener 232 and the second threaded fastener 234 to the panel 985.

Further, in the illustrated example of FIG. 9A, the distance that the first threaded fastener 232 protrudes the first jaw 212 may be similar to the distance that the second threaded fastener 234 protrudes the first jaw 212. Accordingly, the panel 985 may be fastened within the elongate slot of the panel mount 900A in a position that may be perpendicular to the base 216.

Referring still to FIG. 9A, distances between the first threaded hole 232, the second threaded hole 234, and the third threaded hole 236 and the base 216 may be illustrated. The relative distances may be referenced generally to the base 216 or may be referenced generally to the first base surface 218. For example, the direct distance between the third threaded hole 226 and the base 216 may be illustrated as distance "A". The direct distance between the first threaded hole 222 and the base 216 may be illustrated as distance "B". Further, the direct distance between the second threaded hole 224 and the base 216 may be illustrated as distance "C".

In some embodiments, the distance between the third threaded hole 226 and the base 216 (distance "A") may be greater than the distance between the first threaded hole 222 and the base 216 (distance "B"). Further, the distance between the third threaded hole 226 and the base 216 (distance "A") may be less than the distance between the second threaded hole 224 and the base 216 (distance "C"). Thus, when the panel mount 900A is viewed from a side elevation view (see e.g., FIG. 4), the first protrusion from the first threaded fastener 232 and the second protrusion from the second threaded fastener 234 may not align with the pivot protrusion from the third threaded fastener 236.

Reference is now made to FIG. 9B, which is a front elevation view of an example panel mount 900B with a panel 985 fastened between the first jaw 212 and the second jaw 214 in an orientation that is different than that illustrated in FIG. 9A. In FIG. 9B, the received panel 985 may be fastened within the elongate slot of the panel mount 900B in a position that is not perpendicular to the base 216.

As described, the first threaded fastener 232, the second threaded fastener 234, and the third threaded fastener 236 may be independently adjustable towards and away from an opposing jaw. For example, the first threaded fastener 232 may be adjusted to protrude from the surface of the first jaw 212 at a distance that is different than a distance that the second threaded fastener 234 may protrude from the first jaw 212. As illustrated in FIG. 9B, the second threaded fastener 234 may protrude from the first jaw 212 at a greater distance than the first threaded fastener 232. As the third threaded fastener 236 protrudes from the second jaw 214, the third threaded fastener 236 may provide an axis about which the rocker plate 600 and the received panel 985 may pivot. When viewed from a front elevation view (as illustrated in FIG. 9B), because the third threaded fastener 236 may not align with the first threaded fastener 232 and the second threaded fastener 234, the received panel 985 (and the accompanying rocker plate 600 and the adjustable plate 500) may pivot about the protruding third threaded fastener 236 and be fastened in a position that is not perpendicular to the base 216. For example, the rocker plate 600 and the adjustable plate 500 may form a panel receiving slot and the panel receiving slot may pivot about an axis centered on the pivot protrusion.

Reference is now made to FIG. 9C, which is a front elevation view of an example panel mount 900C with a panel 985 fastened between the first jaw 212 and the second jaw 214 in an orientation that is different than that illustrated in FIGS. 9A and 9B.

As described, the first threaded fastener 232, the second threaded fastener 234, and the third threaded fastener 236 may be independently adjustable towards and away from an opposing jaw. For example, the first threaded fastener 232 may be adjusted to protrude from the surface of the first jaw 212 at a distance that is different than a distance that the second threaded fastener 234 may protrude from the first jaw 212. As illustrated in FIG. 9C, the second threaded fastener 234 may protrude from the first jaw 212 at a smaller distance than the first threaded fastener 232. As the third threaded fastener 236 protrudes from the second jaw 214, the third threaded fastener 236 may provide an axis about which the rocker plate 600 and the received panel 985 may pivot. Because the third threaded fastener 236 may not align with the first threaded fastener 232 and the second threaded fastener 234, the received panel 985 (and the accompanying rocker plate 600 and the adjustable plate 500) may pivot about the protruding third threaded fastener 236 and be fastened in a position that, when viewed from a front elevation view as illustrated in FIG. 9C, is not perpendicular to the base 216.

In contrast to FIG. 9B, the received panel 985 in FIG. 9C is fastened in a position that, when viewed from a front elevation view as illustrated in FIG. 9C, is not perpendicular to the base 216 and is tilted in a direction that is different to the received panel 985 illustrated in FIG. 9B.

In some embodiments, the rocker plate 600 may additionally include a concave indentation on a first rocker plate surface, where the first rocker plate surface faces the second jaw 214. The concave indentation may be sized to receive a pivot protrusion on the second jaw 214 or a portion of the third threaded fastener 236 protruding from the second jaw 214. For example, when the pivot protrusion on the second jaw 214 is sized to mate with the concave indentation of the rocker body 610, the point at which the rocker plate 600 pivots may be fixed. Referring briefly again to FIG. 6, the rocker body 610 may additionally include a concave indentation at the "X" marking 630.

Referring still to FIGS. 9A, 9B, and 9C, because the received panel 985 may be fastened between the pivot protrusion and at least one of the first protrusion and the second protrusion, a user may unfasten a received panel from a panel mount in a non-destructive way. For example, by turning the first threaded fastener 232 and/or the second threaded fastener 234 clockwise or counter-clockwise to adjust the position of the fasteners within the threaded holes, a user may release the force coupled from the first threaded fastener 232 and/or the second threaded fastener 234 to the received panel. Accordingly, it would be unnecessary to break any concrete or remove devices wedged within an elongate slot or channel. By releasing force coupled from the first threaded fastener 232 and the second threaded fastener 234 to the received panel, a user may adjust the position of the panel within the panel mount, such as adjusting the amount of the panel (e.g., in a vertical direction) being received within the elongate slot.

Further, in some embodiments of the present application, it is apparent that the position of the received panel 985 may be altered by adjusting threaded fasteners on one jaw, rather than needing to adjust threaded fasteners on two jaws. A user may be able to adjust the position of the received panel 985 from a position that is perpendicular to the base 216 (see e.g., FIG. 9A) to a position that is not perpendicular to the base 216 (see e.g., FIG. 9B or 9C). A user may, for example, achieve a panel 985 position illustrated in FIG. 9B by adjusting the first threaded fastener 232 position to be away from the panel 985 and by adjusting the second threaded fastener 234 position to be further towards the panel 985. That is, a user may turn the first threaded fastener 232 in a counter-clockwise direction and may turn the second threaded fastener 234 in a clockwise direction to achieve the panel 985 position illustrated in FIG. 9B.

Similarly, from the panel 985 position illustrated in FIG. 9A, a user may achieve a panel 985 position illustrated in FIG. 9C by adjusting the first threaded fastener 232 position to be further towards the panel 985 and by adjusting the second threaded fastener 234 position to be away from the panel 985. That is, a user may turn the first threaded fastener 232 in a clockwise direction and may turn the second threaded fastener 234 in a counter-clockwise direction to achieve the panel 985 position illustrated in FIG. 9C.

Based on the foregoing description, it is apparent that the panel 985 position may be altered without needing access to an opposing side of the panel or the third threaded fastener 236 in the second jaw 214. The embodiments in the present application may be useful when panels are mounted in locations where access to opposing sides of the panel may not be possible. For example, one or more panel mounts may be installed on an edge of a high-rise building balcony and glass panel barriers may be fastened to the balcony edge by the panel mounts. Access to the panel mount on an exterior side of the high-rise balcony may not be convenient. With embodiments of the present application, a maintenance technician may adjust the position of the glass panel barriers in a simple, non-destructive, and convenient way by adjusting the threaded fasteners from an interior side of the high-rise balcony edge. In another example, if embodiments of the panel mount were fastened to the edge of a swimming pool and glass panels were fastened to provide a safety barrier between the pool water and a backyard deck, access to the panel mount nearest to the pool may not be convenient. With embodiments of the present application, a user may adjust the position of glass panels in a simple, non-destructive, and convenient way by adjusting threaded fasteners on one side.

As described, in some embodiments, a cantilever arm 620 of a rocker plate 600 described in FIG. 6 may have a non-uniform thickness from a first rocker body end 602 to the cantilever arm end tip 622. Based on the foregoing description of FIGS. 9A, 9B, and 9C, it is apparent that the taper in the cantilever arm 620 thickness may allow the rocker plate 600 to pivot with a greater range of motion as compared to when the cantilever arm 620 thickness were not tapered. For example, referring again to FIG. 9C, the taper in the cantilever arm 620 thickness may allow the received panel 985 to pivot a greater distance towards the first jaw 212 than if the cantilever arm 620 were not tapered. If the cantilever arm 620 were not tapered, when pivoting the panel 985 towards the first jaw 212, an un-tapered cantilever arm may be afforded a small degree of pivot capability compared to a tapered cantilever arm.

Figure 10:
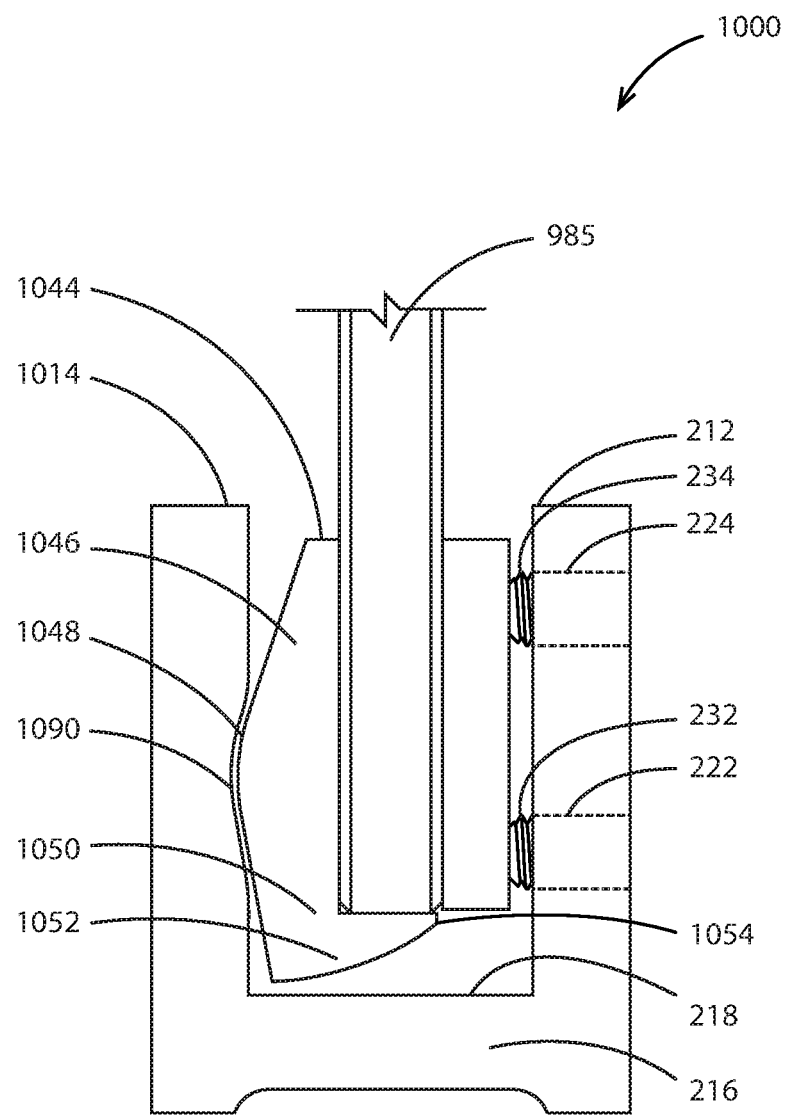
FIG. 10 is a front elevation view of another example panel mount with a panel received therein.

Reference is now made to FIG. 10, which is a front elevation view of an example panel mount 1000 with a panel 985 received therein, in accordance with another embodiment of the present application. In FIG. 10, the rocker plate 1044 and the adjustable plate 500 may form a panel receiving slot for receiving the panel 985. The panel mount 1000 includes a first jaw 212 and a second jaw 1014 extending from the first base surface 218 of the base 216. The panel mount 1000 also includes a first threaded hole 222 for receiving a first threaded fastener 232 and a second threaded hole 224 for receiving a second threaded fastener 234 on the first jaw 212. The first threaded fastener 232 may be a first protrusion when the first threaded fastener 232 is adjusted to protrude from the first jaw 212 towards the second jaw 1014. The second threaded fastener 234 may be a second protrusion when the second threaded fastener 234 is adjusted to protrude from the first jaw 212 towards the second jaw 1014. The panel mount 1000 also includes a concave indentation 1090 in the second jaw 1014 to receive a convex protrusion 1048 of the rocker plate 1044.

In FIG. 10, the rocker plate 1044 is positioned between the first jaw 212 and the second jaw 1014. The rocker plate 1044 includes a rocker body 1046 having the convex protrusion 1048. The convex protrusion 1048 is adjacent the second jaw 1014 and may be received within the concave indentation 1090 in the second jaw 1014. The rocker plate 1044 also includes a cantilever arm 1052 coupled to a first rocker body end 1050. The cantilever arm 1052 may extend from the first rocker body end 1050 to a cantilever arm end tip 1054.

In some embodiments, because the convex protrusion 1048 is adjacent the second jaw 1014 and may be received within the concave indentation 1090 in the second jaw 1014, the rocker plate 1044 may pivot about an axis centered on the concave indentation 1090. Further, the panel 985 may be fastened between the rocker plate 1044 and at least one of the first protrusion or the second protrusion.

For example, similar to the panel mounts described in FIGS. 9A to 9C, in FIG. 10, the first threaded fastener 232 and the second threaded fastener 234 may be independently adjustable towards and away from the second jaw 1014. The first threaded fastener 232 may be adjusted to protrude from the surface of the first jaw 212 at a distance that is different than a distance that the second threaded fastener 234 may protrude from the first jaw 212. Accordingly, when the first protrusion protrudes at a greater distance than the second protrusion, the received panel 985 (and accompanying rocker plate 1044 and adjustable plate 500) may be fastened in a position that is not perpendicular to the base 216.

In some embodiments, the adjustable plate 500 is positioned between the received panel 985 and the first jaw 212. For example, a first surface of the adjustable plate 500 may abut the first threaded fastener 232 and the second threaded fastener 234 protruding from the first jaw 212. Further, a second surface of the adjustable plate 500 may abut the received panel 985. Thus, the adjustable plate 500 may couple non-penetrating force from the protruding first threaded fastener 232 and the second threaded fastener 234 to the received panel 985.

As illustrated in FIG. 10, when the first threaded fastener 232 and the second threaded fastener 234 protrude a surface of the first jaw 212 by the same distance, the received panel 985 may be fastened between the first jaw 212 and the second jaw 1014 in a position that is perpendicular to the base 216.

As noted, the convex protrusion 1048 of the rocker plate 1044 may be sized to be received within the concave indentation 1090 of the second jaw 1014. Accordingly, in some embodiments, the rocker body 1046 may have a non-rectangular shape.

The cantilever arm 1052 has a cantilever arm thickness. In some embodiments, the cantilever arm 1052 may have a uniform thickness from the first rocker body end 1050 to the cantilever arm end tip 1054. In other embodiments, the cantilever arm 1052 may have a non-uniform thickness from the first rocker body end 1050 to the cantilever arm end tip 1054. For example, as illustrated in FIG. 10, the cantilever arm 1052 may have a cantilever arm thickness that tapers from the first rocker body end 1050 to the cantilever arm end tip 1054. That is, the thickness of the cantilever arm 1052 at a location near the first rocker body end 1050 may be largest, while the thickness of the cantilever arm 1052 at the cantilever arm end tip 1054 may be smallest. In some embodiments, the thickness of the cantilever arm 1052 may gradually decrease from the first rocker body end 1050 to the cantilever arm end tip 1054. The tapered thickness of the cantilever arm 1052 may facilitate pivoting of the rocker plate 1044 about an axis centered on the concave indentation 1090 on the second jaw 1014.

In some other embodiments, the thickness of the cantilever arm 1052 may gradually increase from the first rocker body end 1050 to the cantilever arm end tip 1054 and the rocker body 1046 may be alternatively shaped to facilitate pivoting the rocker plate 1044 about the axis centered on the concave indentation 1090 on the second jaw 1014.

Based on the foregoing discussion, it is apparent that the panel mount 1000 illustrated in FIG. 10 may provide a pivot point without use of threaded fasteners or threaded holes on the second jaw 1014.

Although the example panel mount 1000 described with reference to FIG. 10 includes a rocker plate 1044 having a cantilever arm 1052 coupled to the first rocker body end 1050, in some other embodiments, the rocker plate 1044 may not have a cantilever arm 1052. For example, the panel 985 may be received between the adjustable plate 500 and a rocker plate without any cantilever arm. In some embodiments, where the rocker plate 1044 may not include a cantilever arm, one or more setting blocks (not illustrated in FIG. 10) may be positioned on and/or abut the first base surface 218 to prevent contact between the received panel 985 and the first base surface 218. In some embodiments, the one or more setting blocks may be made of rubber and/or plastic material.

Further, although the example panel mount 1000 described with reference to FIG. 10 includes a concave indentation 1090 in the second jaw 1014 to receive a convex protrusion 1048 of the rocker plate 1044, in some embodiments, the second jaw 1014 may not have and/or may not require any such concave indentation. That is, the rocker plate 1044 may include a rocker body having a convex protrusion 1048, and the convex protrusion 1048 may abut the second jaw 1014 to provide a pivot point about an axis centered on the convex protrusion. For example, the convex protrusion 1048 may face a surface of the second jaw 1014, and the surface of the second jaw 1014 may be flat and may abut the convex protrusion 1048 to provide a pivot point about an axis centered on the convex protrusion.

Figure 11:
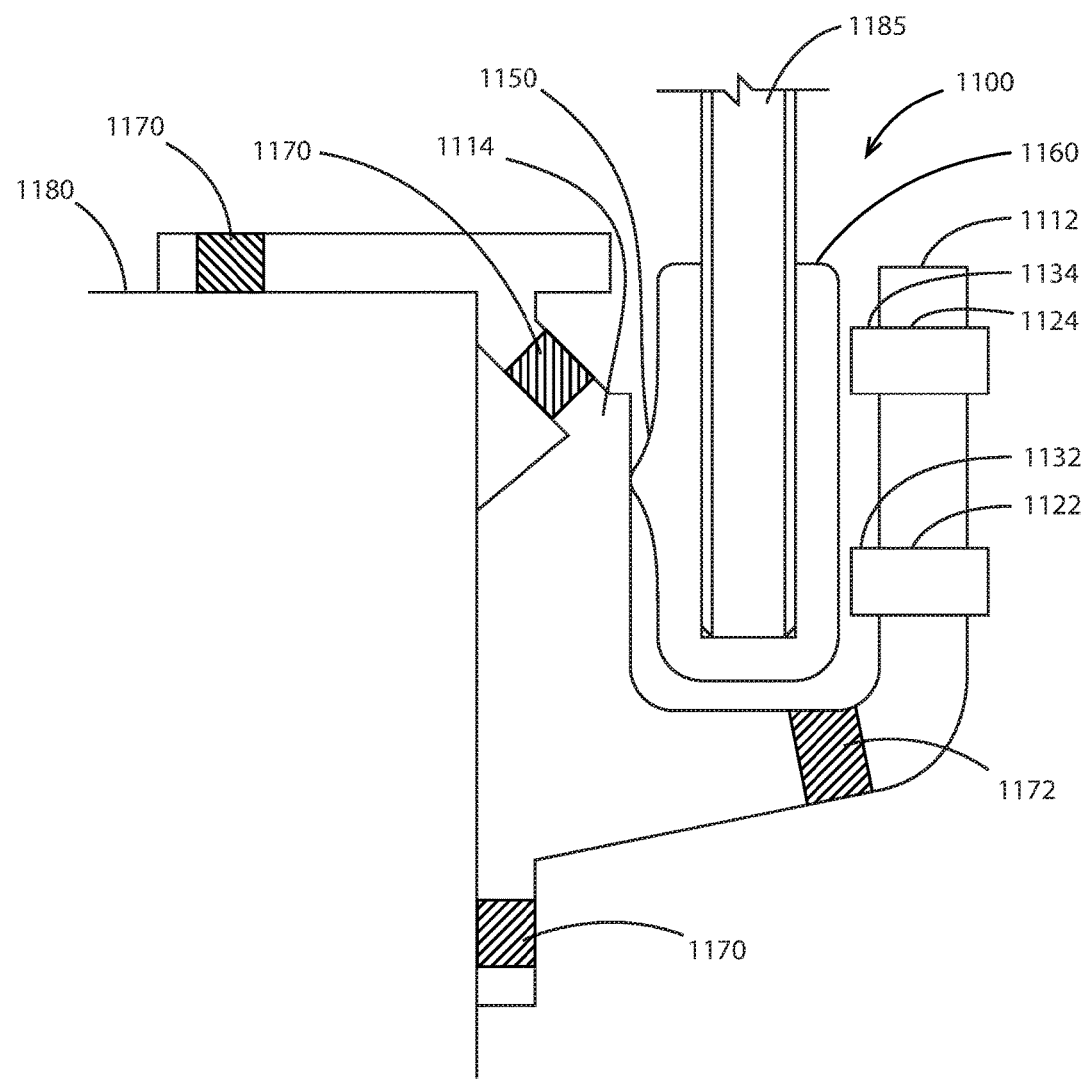
FIG. 11 is a front elevation view of another example panel mount fastened to a structure.

Reference is now made to FIG. 11, which is a front elevation view of another example panel mount 1100 fastened to a structure 1180. The panel mount 1100 includes a first jaw 1112 and a second jaw 1114. Further, the panel mount 1100 may include a rocker plate 1160 that wraps around a portion of a received panel 1185. The rocker plate 1160 may include convex protrusion 1150 facing the second jaw 1114. In the illustrated embodiment, the convex protrusion 1150 may not align with portions of a first threaded fastener 1132 (received within a first threaded hole 1122) and a second threaded fastener 1134 (received within a second threaded hole 1124) protruding from a surface of the first jaw 1112. Accordingly, a user may adjust the position of the received panel 1185 by independently adjusting the first threaded fastener 1132 and the second threaded fastener 1134 towards and away from the second jaw 1114.

As illustrated in FIG. 11, the panel mount 1100 also includes mounting holes 1170. In some embodiments, the mounting holes 1170 may be threaded holes for receiving threaded fasteners, such as screws or bolts. In some other embodiments, the mounting holes 1170 may be non-threaded holes and may be configured to receive anchor fasteners, such as wedge anchors, sleeve anchors, tapcon screws, and/or lag bolts. The fasteners may secure the panel mount 1100 to the structure 1180. For example, portions of the second jaw 1114 may be adhered or fastened to a structure 1180.

Further, the second jaw 1114 and the structure 1180 may not be accessible by a user. Accordingly, a user may adjust the position of the received panel 1185 to a position that is not parallel to a wall of the structure 1180 by independently turning the first threaded fastener 1132 and/or the second threaded fastener 1134 counter-clockwise or clockwise such that one of the first threaded fastener 1132 or the second threaded fastener 1134 protrudes the surface of the first jaw by a greater distance than the other of the first threaded fastener 1132 or the second threaded fastener 1134.

In some embodiments, the panel mount 1100 may also include a weeping hole 1172. For example, the weeping hole 1172 may be a small opening in the panel mount 1100 that allows water or other liquids to drain from the assembly.

Embodiments of panel mounts may include a set of two protrusions on a first jaw and a pivot point on the second jaw, in accordance with the description of the present application. For example, two protrusions may be provided when a first threaded fastener is adjusted to protrude from a first jaw towards a second jaw, and when a second threaded fastener is adjusted to protrude from the first jaw towards the second jaw. Further, the pivot point on the second jaw may be provided when a third threaded fastener is adjusted to protrude from the second jaw towards the first jaw. In other embodiments, the pivot point may be provided by a concave indentation in the second jaw. In further embodiments, the pivot point may be may be a point at which a convex protrusion on a rocker plate abuts the second jaw. Accordingly, a panel may be fastened between the set of two protrusions and the pivot point. Further, when one of the two protrusions protrudes from the first jaw at a greater distance than the other, the panel may pivot about an axis centered on the pivot point.

In some embodiments, a panel mount system may include a channel for receiving one or more panels. The channel may include multiple sets of two protrusions and a pivot point. That is, each set of two protrusions and the pivot point may be successively positioned along the channel. Accordingly, one or more panels may be fastened between the successive sets of protrusions and pivot points.

Certain adaptations and modifications of the described embodiments can be made. Therefore, the above discussed embodiments are considered to be illustrative and not restrictive.

What is claimed is:

1. A panel mount for adjustably fastening a panel to a structure, the panel mount comprising:
   a base having a first base surface;
   a first jaw and a second jaw extending from the first base surface, the first jaw and the second jaw defining an elongate slot;
   a first threaded hole and a second threaded hole in the first jaw, the first threaded hole and the second threaded hole extending through the first jaw, the first threaded hole being nearer to the first base surface than the second threaded hole;
   a first threaded fastener received within the first threaded hole, the first threaded fastener being a first protrusion when the first threaded fastener is adjusted to protrude from the first jaw towards the second jaw;
   a second threaded fastener received within the second threaded hole, the second threaded fastener being a second protrusion when the second threaded fastener is adjusted to protrude from the first jaw towards the second jaw; and
   a rocker plate positioned between the first jaw and the second jaw, the rocker plate including a rocker body having a convex protrusion, the convex protrusion abutting the second jaw to provide a pivot point about an axis centered on the convex protrusion such that the panel pivots about the pivot point when protrusion of the first threaded fastener or the second threaded fastener from the first jaw is adjusted, whereby the panel is to be fastened between the rocker plate and at least one of the first protrusion or the second protrusion, and wherein the rocker plate includes a cantilever arm coupled to a first rocker body end, and wherein the cantilever arm extends from the first rocker body end towards the first jaw to a cantilever arm tip.

2. The panel mount of claim 1, wherein the cantilever arm has a cantilever arm thickness, and wherein the cantilever arm thickness tapers from the first rocker body end to the cantilever arm end tip.

3. The panel mount of claim 1, wherein the panel mount further comprises a concave indentation in the second jaw receiving the convex protrusion to provide the pivot point about an axis centered on the concave indentation.

4. The panel mount of claim 3, wherein a first distance is a direct distance between the first threaded hole and the first base surface, and wherein a second distance is a direct distance between the second threaded hole and the first base surface, and wherein a third distance is a direct distance between the concave indentation in the second jaw and the first base surface, and wherein the third distance is greater than the first distance, and wherein the third distance is less than the second distance.

5. The panel mount of claim 3, wherein the base is in a base plane, and wherein the first jaw is in a first jaw plane, the first jaw plane being perpendicular to the base plane, and wherein the second jaw is in a second jaw plane, the second jaw plane being parallel to the first jaw plane, and wherein the first threaded hole, the second threaded hole, and the concave indentation in the second jaw are in a protrusion plane perpendicular to the base plane, the first jaw plane and the second jaw plane.

6. The panel mount of claim 1, further comprising an adjustable plate between the first jaw and the rocker plate, wherein the adjustable plate includes a first adjustable plate surface abutting at least one of the first threaded fastener or the second threaded fastener.

7. The panel mount of claim 6, further comprising a first compression pad on a second adjustable plate surface.

8. The panel mount of claim 6, wherein the rocker plate is coupled to the adjustable plate at a coupling point, the coupling point including the cantilever arm end tip and a first adjustable plate end, the first adjustable plate end being adjacent the first base surface, and wherein the coupling point is flexible.

9. The panel mount of claim 1, further comprising a second compression pad on a rocker plate surface facing the first jaw.

10. The panel mount of claim 1, wherein the base has a second base surface opposite the first base surface, the panel mount further comprising a base fastener to couple the panel mount to the structure.

11. The panel mount of claim 1, further comprising one or more setting blocks abutting the first base surface to prevent contact between the panel and the first base surface.

12. The panel mount of claim 1, wherein a panel facing surface of the second jaw abutting the convex protrusion is substantially flat.

13. A panel mount system comprising a plurality of panel mounts as defined in claim 1, wherein the plurality of panel mounts are successively positioned to receive a portion of one or more received panels.

* * * * *